United States Patent [19]

Boggs

[11] 4,358,557
[45] Nov. 9, 1982

[54] FOUR COMPONENT HOT-MELT ADHESIVES

[75] Inventor: Brenda J. Boggs, Longview, Tex.

[73] Assignee: Eastman Kodak Company, Rochester, N.Y.

[21] Appl. No.: 355,659

[22] Filed: Mar. 8, 1982

[51] Int. Cl.³ .................. C08L 23/08; C08L 31/04; C08L 93/04; C08L 91/06
[52] U.S. Cl. ................................ 524/272; 524/271; 524/476; 524/477; 524/489; 524/499; 524/524; 525/222; 525/210
[58] Field of Search ............... 525/222; 524/524, 271, 524/272, 489, 476

[56] References Cited

U.S. PATENT DOCUMENTS

| | | | |
|---|---|---|---|
| 3,245,931 | 4/1966 | Matthew | 260/28.5 |
| 3,468,978 | 9/1969 | Battersby | 525/222 |
| 3,644,252 | 2/1972 | Shenfeld et al. | 260/27 R |
| 3,644,254 | 2/1972 | Dew | 260/28.5 AV |
| 4,299,745 | 11/1981 | Godfrey | 525/222 |

Primary Examiner—Carman J. Seccuro
Attorney, Agent, or Firm—Clyde L. Tootle; Daniel B. Reece, III

[57] ABSTRACT

The hot-melt adhesives of the present invention comprise a blend of ethylene-vinyl acetate copolymer, hydrocarbon tackifier resin, aromatic low softening point tackifying resin and paraffin wax. These hot-melt adhesive compositions provide adhesives especially useful for bonding polyethylene film to a nonwoven support. The bonds provided by this adhesive have a novel combination of properties such as good static shear lap bond strength, low elongation and good elevated temperature properties.

10 Claims, No Drawings

FOUR COMPONENT HOT-MELT ADHESIVES

This invention relates to hot-melt adhesive compositions having a novel combination of properties. More specifically, the invention relates to hot-melt adhesive compositions comprising a blend of ethylene vinyl acetate copolymers, hydrocarbon tackifier resin, aromatic low softening point hydrocarbon resin and paraffin wax which provide an adhesive having good static shear lap bond strength, good elevated temperature properties and low elongation. Such adhesives are particularly useful for the bonding of polyethylene film and nonwoven substrates.

Hot-melt adhesives produce a bond by mere cooling as distinguished from crosslinking or other chemical reactions. Prior to heating, the hot-melt adhesives are solids that can be prepared in bulk or pellet form for ease of handling. Upon heating, the hot-melt adhesive composition melts and flows freely for application to a substrate. Since the hot-melt adhesives of the present invention are thermoplastic rather than thermosetting, and thus remeltable, they can be applied to a particular substrate and later remelted to form a hot-melt bond between this substrate and another substrate.

The uses for hot-melt adhesives are unlimited, however, it has been found that while one hot-melt may be used for bonding in a particular use or application, the adhesive may be completely unsuitable for other uses or applications. Therefore, one particular hot-melt adhesive which will be excellent for bonding paper and cardboard does not form acceptable bonds between other substrates such as rubber and metals, for example. Moreoover, some uses for hot-melt adhesives require not only that the adhesive provide satisfactory bonds between different substrates, which may be the same or different, such as polyethylene film and a nonwoven polyester substrate, but the bonds must be flexible, have good static shear strength of at least 8 hours and have 180° peel strength of at least 1.81 kilograms. These properties are especially needed for hot-melt adhesives to be used in making disposable diapers.

In accordance with the present invention, I have found that a blend comprising ethylene vinyl acetate copolymers, hydrocarbon tackifier resin, aromatic low softening point tackifier resin and paraffin wax, provides a hot-melt adhesive having this novel combination of properties. This hot-melt adhesive also provides strong bonds between polyethylene films and nonwoven substrates. This combination of four adhesive components also provides an adhesive having a low viscosity and provides bonds which have high tensile strength and low elongation (less than 150%).

The ethylene-vinyl acetate copolymers useful in the practice of this invention may contain from about 18 to about 40 weight percent vinyl acetate, preferred range is from about 25 to about 35 weight percent, most preferred 28 weight percent. The melt index of these ethylene-vinyl acetate copolymers may range from about 70 to about 550, preferably in the range of about 130 to about 550, most preferred 400, to produce the lower viscosity adhesives which are easily machined in conventional commercial equipment.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such suitable hydrocarbon tackifying resin is a hydrocarbon resin having a softening point of 100° C. and available commercially as Eastman Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball Softening Point of from about 80° to 135° C.; an acid number of from about 0 to 2; a saponification value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinoline, limonene, terpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The aromatic hydrocarbon resins are of intermediate molecular weight, e.g., from about 300 to about 6,000, preferably about 750 to 1,000, and which have a softening point of less than 50° C. and are viscous liquids at room temperature. Suitable commercially available resins include "Piccolastic" A, D and E series, especially the A series resins. One such resin is Piccolastic A-25 which is a polystyrene resin having a softening point of 25° C., a color of 3 (Gardner), an acid number <1 and a specific gravity of 1.05 and a melt viscosity of 100 poise at 47° C.

The paraffin waxes useful in this invention are waxes having a Ring and Ball Softening Point of about 120° C. to 160° C., preferably 140° C. to 150° C., which are obtained during petroleum refining processes. Such waxes are well known in the art and are readily available commercially.

The aromatic low softening point tackifying resin is employed in an amount of about 10 to 20 percent by weight, preferably 8–15 percent by weight, of the adhesive formulation. If less than 10 percent by weight is employed the formulation loses adhesion wetting characteristics. If more than 20 percent by weight is employed the formation does not have the desired static shear properties. The ethylene-vinyl acetate copolymer is used in an amount of 30 to 40 percent by weight, preferably 30 to 35 percent. An amount less than 20 percent causes the adhesive formulation to lose static peel adhesion and amounts greater than 50 percent cause the adhesive to have poor static shear properties. The tackifying resins can be used either as a single resin or as a combination of tackifying resins. These tackifying resins can be used in amounts of about 35 percent to about 55 percent by weight of the adhesive composition, preferably about 45 to 50 percent by weight. More than 60 percent by weight tackifier provides an adhesive which is too brittle to be used on flexible substrates and less than 25 percent by weight, the adhesive formulation does not have the desired static peel property. The wax can be used in an amount of 2.5 percent by weight to 10 percent by weight, preferably 5 percent. If less than 2.5 percent wax is present the viscosity of the adhesive is too high and more than 10% the cohesive strength and softening point are lowered so as to have reduced adhesion to the substrates.

The adhesive compositions of this invention are prepared by blending together the components in the melt at a temperature of about 160° C. to about 200° C. until a homogeneous blend is obtained, approximately two hours. Various methods of blending materials of this type are known to the art and any method that produces a homogeneous blend is satisfactory. These components blend easily in the melt, and a heated vessel equipped with a stirrer is all that is required. For example, a Cowles stirrer provides an effective mixing means for preparing these hot-melt adhesive compositions.

In addition to the above-listed components, it is desirable for the hot-melt adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, Ionox 330 [tris(di-t-butyl-phydroxybenzyl)trimethylbenzene], Dalpac 4C2 [6-di(t-butyl)-p-cresol], Naugawhite (alkylated bisphenol), Butyl Zimate (zinc dibutyl dithiocarbamate), Ethyl 702 [4,4'-methylene bis(2,6-di-tert-butylphenol)], Irganox 1010 tetrakis[methylene-3-(3',5'-di-t-butyl-4'-hydroxyphenyl)propionate] methane, Cyanox 1212 (American Cyanamid) lauryl stearyl thiodipropionate, and Cyanox LTDP (dilauryl 3,3'-thiodipropionate).

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 123 grams of an aromatic tackifying resin having a softening point of 25° C., a Gardner color of 3, an acid number of less than 1 and a specific gravity of 1.04; about 500 grams of a hydrocarbon tackifier having a Ring and Ball Softening Point of 100° C.; 325 grams of ethylene-vinyl acetate copolymer having a melt index at 190° C. of 400 and a vinyl acetate content of 28%; 50 grams of paraffin wax; and about 2 grams of Irganox 1010 antioxidant are blended in a 5-liter round-bottom flask at 180° C. under nitrogen with stirring for three hours. This blend has a melt viscosity of approximately 850 cp at 177° C. in a Brookfield Thermosel Viscometer and a softening point of 65° C. Bonds made with this adhesive bonding polyethylene film to a polyester nonwoven substrate had 180° peel strength of 2.0 kilograms and a static shear strength of greater than 8 hours at 38° C. This adhesive is particularly useful in fabricating disposable diapers.

EXAMPLE 2

The process described in Example 1 is repeated except that the aromatic polystyrene resin is replaced with an additional amount of hydrocarbon tackifier resin having a Ring and Ball Softening Point of 100° C. The blend did not have sufficient adhesion to adhere the nonwoven substrate to the polyethylene substrate.

EXAMPLE 3

The process described in Example 1 is repeated except only the hydrocarbon tackifying resin and ethylene-vinyl acetate copolymer are blended together. The blend was too high in viscosity for adequate application to a polyethylene substrate. In order to lower the viscosity to the point where this composition can be adequately applied to a polyethylene substrate it was necessary to increase the melt temperature higher than the melting point of the polyethylene substrate.

EXAMPLE 4

About 91 grams of an aromatic tackifying resin having a softening point of 25° C., a Gardner color of 3, an acid number of less than 1 and a specific gravity of 1.04; about 370 grams of a hydrocarbon tackifier having a Ring and Ball Softening Point of 100° C.; 500 grams of ethylene-vinyl acetate copolymer having a melt index at 190° C. of 400 and a vinyl acetate content of 28%; 37 grams of paraffin wax; and about 2 grams of Irganox 1010 antioxidant are blended in a 5-liter round-bottom flask at 180° C. under nitrogen with stirring for three hours. This blend has a melt viscosity of approximately 3,000 cp at 177° F. in a Brookfield Thermosel Viscometer and a softening point of 68° C. Bonds made with this adhesive bonding polyethylene film to a polyester nonwoven substrate had 180° peel strength of 2.1 kilograms and a static shear strength of less than 1 hour at 38° F. This adhesive containing 50 weight percent ethylene-vinyl acetate copolymer is not useful in fabricating disposable diapers due to the lower static shear strength.

EXAMPLE 5

About 200 grams of an aromatic tackifying resin having a softening point of 25° C., a Gardner color of 3, an acid number of less than 1 and a specific gravity of 1.04; about 456 grams of a hydrocarbon tackifier having a Ring and Ball Softening Point of 100° C.; 296 grams of ethylene-vinyl acetate copolymer having a melt index at 190° C. of 400 and a vinyl acetate content of 28%; 46 grams of paraffin wax; and about 2 grams of Irganox 1010 antioxidant are blended in a 5-liter round-bottom flask at 180° C. under nitrogen with stirring for three hours. This blend has a melt viscosity of approximately 600 cp at 177° C. in a Brookfield Thermosel Viscometer and a softening point of 62° C. Bonds made with this adhesive bonding polyethylene film to a polyester nonwoven substrate had 180° peel strength of 2.00 kilograms and a static shear strength of about 2 hours at 38° C. This adhesive containing 29.6 weight percent ethylene-vinyl acetate copolymer is particularly not useful in fabricating disposable diapers due to the poor static shear strength.

EXAMPLE 6

About 145 grams of an aromatic tackifying resin having a softening point of 25° C., a Gardner color of 3, an acid number of less than 1 and a specific gravity of 1.04; about 593 grams of a hydrocarbon tackifier having a Ring and Ball Softening Point of 100° C.; 200 grams of ethylene-vinyl acetate copolymer having a melt index at 190° C. of 400 and a vinyl acetate content of 28%; 59 grams of paraffin wax; and 3.0 grams of Irganox 1010 antioxidant are blended in a 5-liter round-bottom flask at 180° C. under nitrogen with stirring for three hours. This blend has a melt viscosity of approximately 290 cp at 177° C. in a Brookfield Thermosel Viscometer and a softening point of 62° C. Bonds made with this adhesive bonding polyethylene film to a polyester nonwoven substrate had 180° peel strength of 0.4 kilograms and a static shear strength of about 6 hours at 38° C. This adhesive containing 59.3 weight percent hydrocarbon tackifier and 20 weight percent ethylene-vinyl acetate copolymer is particularly not useful in fabricating disposable diapers due to the poor 180° peel strength and lowered static shear strength.

EXAMPLE 7

About 184 grams of an aromatic tackifying resin having a softening point of 25° C., a Gardner color of 3, an acid number of less than 1 and a specific gravity of 1.04; about 250 grams of a hydrocarbon tackifier having a Ring and Ball Softening Point of 100° C.; 488 grams of ethylene-vinyl acetate copolymer having a melt index at 190° C. of 400 and a vinyl acetate content of 28%; 75 grams of paraffin wax; and 3.0 grams of Irganox 1010 antioxidant are blended in a 5-liter round-bottom flask at 180° C. under nitrogen with stirring for three hours. This blend has a melt viscosity of approximately 1900 cp at 177° C. in a Brookfield Thermosel Viscometer and a softening point of 68° C. Bonds made with this adhesive bonding polyethylene film to a polyester nonwoven substrate had 180° peel strength of 2.30 kilograms and a static shear strength of about 7 hours at 38° C. This adhesive containing 25 weight percent hydrocarbon tackifier and 48.8 weight percent ethylene-vinyl acetate copolymer is particularly not useful in fabricating disposable diapers due to the lower static shear strength.

The invention has been described in detail with particular reference to preferred embodiments thereof, but it will be understood that variations and modifications can be made within the spirit and scope of the invention.

I claim:

1. An adhesive composition capable of being used as a hot melt adhesive comprising a blend of
   (a) about 10 to 20 percent by weight of at least one aromatic hydrocarbon resin having a softening point of less than 50° C.,
   (b) about 30 to 40 percent by weight of at least one ethylene-vinyl acetate copolymer,
   (c) about 35 to 55 percent by weight of at least one tackifier resin selected from the group consisting of hydrocarbon resin, polyterpene resin and rosin ester resin, and
   (d) about 2.5 to 10 percent by weight of a paraffin wax having a Ring and Ball Softening Point of about 120° C. to 160° C.

2. An adhesive composition according to claim 1 wherein said ethylene-vinyl acetate copolymer contains from about 18 to about 40 weight percent vinyl acetate.

3. An adhesive composition according to claim 2 wherein said aromatic hydrocarbon resin has a molecular weight of from about 300 to about 6,000.

4. An adhesive composition according to claim 3 wherein said tackifier resin is a hydrocarbon tackifier resin.

5. An adhesive composition according to claim 4 wherein said hydrocarbon tackifier resin is DAC-B hydrocarbon resin having a softening point of 100° C.

6. An adhesive composition capable of being used as hot melt adhesive comprising a blend of
   (a) about 8 to 15 weight percent of at least one aromatic hydrocarbon resin having a softening point of less than 50° C.,
   (b) about 30 to 35 weight percent of at least one ethylene-vinyl acetate copolymer,
   (c) about 45 to 50 weight percent of at least one tackifier selected from the group consisting of hydrocarbon resin, polyterpene resin or rosin ester resin, and
   (d) about 5 percent by weight of paraffin wax having a Ring and Ball softening point of about 140° C. to 150° C.

7. A adhesive composition according to claim 5 wherein said ethylene-vinyl acetate copolymer contains from about 25 to about 35 weight percent vinyl acetate.

8. An adhesive composition according to claim 6 wherein said aromatic hydrocarbon resin has a molecular weight of from about 750 to about 1,000.

9. An adhesive composition according to claim 7 wherein said tackifier resin is a hydrocarbon tackifier resin.

10. An adhesive composition according to claim 9 wherein said hydrocarbon resin is DAC-B hydrocarbon resin having a softening point of 100° C.

* * * * *